(12) United States Patent
Sakata et al.

(10) Patent No.: US 8,063,506 B2
(45) Date of Patent: Nov. 22, 2011

(54) CAR POWER SOURCE APPARATUS

(75) Inventors: Hideki Sakata, Nishinomiya (JP); Takeshi Oosawa, Takasago (JP); Akira Matsumoto, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 110 days.

(21) Appl. No.: 12/372,944

(22) Filed: Feb. 18, 2009

(65) Prior Publication Data

US 2009/0212627 A1  Aug. 27, 2009

(30) Foreign Application Priority Data

Feb. 21, 2008  (JP) ................................. 2008-40716

(51) Int. Cl.
*H02H 7/18* (2006.01)
(52) U.S. Cl. ..................... 307/10.7; 307/9.1; 307/10.1
(58) Field of Classification Search .................. None
See application file for complete search history.

(56) References Cited

U.S. PATENT DOCUMENTS

| | | | | | |
|---|---|---|---|---|---|
| 2,559,468 | A | * | 7/1951 | Scheg | 246/38 |
| 3,778,576 | A | * | 12/1973 | Anderson et al. | 200/264 |
| 4,410,775 | A | * | 10/1983 | Howard | 200/52 R |
| 6,194,792 | B1 | * | 2/2001 | Yanou et al. | 307/10.1 |
| 6,333,568 | B1 | * | 12/2001 | Bitsche et al. | 307/10.1 |
| 6,657,408 | B2 | * | 12/2003 | Goto et al. | 318/442 |
| 6,934,141 | B2 | * | 8/2005 | Hamano et al. | 361/160 |
| 7,012,793 | B2 | * | 3/2006 | Cheevanantachai et al. | 361/82 |
| 7,368,829 | B2 | * | 5/2008 | Tezuka | 307/9.1 |
| 7,468,565 | B2 | * | 12/2008 | Hoshiba | 307/10.1 |
| 7,816,804 | B2 | * | 10/2010 | Soma et al. | 307/10.1 |
| 2002/0057015 | A1 | * | 5/2002 | Kikuta et al. | 307/10.1 |
| 2003/0202296 | A1 | * | 10/2003 | Hamano et al. | 361/2 |
| 2004/0150926 | A1 | * | 8/2004 | Wilk et al. | 361/42 |
| 2005/0253460 | A1 | * | 11/2005 | Nakanishi et al. | 307/10.1 |

FOREIGN PATENT DOCUMENTS

JP   2005-295697   10/2005

OTHER PUBLICATIONS

JP 2005-295697 to Yugo et al., english translation, Oct. 20, 2005.*

* cited by examiner

*Primary Examiner* — Rexford Barnie
*Assistant Examiner* — Justen Fauth
(74) *Attorney, Agent, or Firm* — Wenderoth, Lind & Ponack, L.L.P.

(57) ABSTRACT

A power source apparatus of a car is provided with contactors (2) connected to an output-side of a battery (1); a pre-charge circuit (3) made up of a series connected pre-charge resistor (6) and a pre-charge relay (7), which is connected with a contactor (2) to supply auxiliary charge to a capacitor (21) connected to a car-side of the battery (1); and a control circuit (4) to control the contactors (2) and the pre-charge relay (7). The pre-charge resistor (6) is connected in parallel with a contactor (2), and the pre-charge relay (7) is connected in series with that contactor (2). The control circuit (4) switches the pre-charge relay (7) ON to pre-charge the car-side capacitor (21), and then switches the contactor (2) ON to connect the battery (1) to the car-side.

20 Claims, 4 Drawing Sheets

CAR POWER SOURCE APPARATUS

BACKGROUND OF THE INVENTION

1. Field of the Invention

The present invention relates to a power source apparatus that connects the vehicle driving battery to the car-side load via contactors (high power, electric automotive-grade relays), and in particular relates to a car power source apparatus that prevents the detrimental effects of fused contacts.

2. Description of the Related Art

The car power source apparatus has first and second contactors that connect to the positive and negative output-side of the battery. In this power source apparatus, contactors are switched ON to connect the battery with the car-side load. When the vehicle is not in use, for example, when the automobile ignition switch is OFF, the contactors are switched OFF. Furthermore, if the automobile has an accident or collision, the contactors are also switched OFF to cut-off battery output and increase safety.

A capacitor with a large capacitance value is connected in parallel with the car-side load that connects with the power source apparatus. Its purpose is to instantaneously output high power. The capacitor is charged by the battery. Since the capacitance of the capacitor is high, charging current becomes extremely large when the capacitor is completely discharged. Consequently, when the contactors, which connect to the positive and negative output-side of the battery, are switched ON, extremely large transient charging current can flow. Large charging current can damage contacts on the contactors. In particular, contactor contacts can fuse together due to large charging current. If the contacts fuse together, the contactors cannot be switched OFF and the driving battery cannot be disconnected from the load. To prevent this negative result, a power source apparatus has been developed that is provided with a pre-charge circuit to pre-charge the capacitor before turning the contactors ON (refer to Japanese Patent Application Disclosure 2005-295697).

As shown in FIG. 1, the car power source apparatus described in JP 2005-295697 is provided with a pre-charge circuit to supply auxiliary charge to the capacitor. The pre-charge circuit is connected in parallel with the first contactor on the positive-side of the battery and supplies auxiliary charge to the capacitor while limiting current. This pre-charge circuit is provided with a current-limiting pre-charge resistor, and a pre-charge relay connected in series with the pre-charge resistor. In this power source apparatus, the second contactor connected to the negative-side of the battery and the pre-charge relay are switched ON to pre-charge the capacitor. After the capacitor is pre-charged, the first contactor is switched ON to connect the battery with the car-side.

In the power source apparatus shown in FIG. 1, if the car-side becomes short circuited, extremely high current, for example 1000 A of short circuit current, can flow through the contactors. High short circuit current is a cause of contactor contacts fusing together. In particular, if the contacts "chatter" under short circuit conditions, they can easily become fused together. Contactors are switched ON and OFF each time the car ignition switch is turned ON and OFF. Further, since the contactors switch high currents, a long-lifetime durable metal such as tungsten is used as the contact material. For example, currently adopted contactors utilize durable contacts having fixed contacts of copper, and moveable contacts of tungsten laminated on a copper surface. Durable contacts demonstrate superior long-lifetime characteristics when switched ON and OFF with high currents. However, contactors provided with durable contacts cannot effectively prevent fused contacts due to high current flow from a car-side short circuit. This occurs because, if contact "chatter" occurs under high current conditions, tungsten, which is a durable contact material, will be heated to high temperature and will melt copper.

Fused contacts due to short circuit current can be prevented with high-capacity type contacts having fixed contacts and moveable contacts made of copper. However, while high-capacity type contacts made of copper can prevent short circuit induced fused contacts, they have the drawback that long-lifetime cannot be achieved. Copper, which is a high-capacity type contact material, shows low contact temperature rise due to short circuit current flow, but copper has a low melting point. Tungsten, which is a durable contact material, shows high contact temperature rise due to short circuit current flow, but tungsten has a high melting point. Consequently, in a contactor having fixed contacts of copper and moveable contacts with tungsten on the surface, the tungsten will be heated to high temperature by short circuit current and copper will melt causing the contacts to fuse together. Contactors with fixed and moveable contacts of copper show less contact temperature rise due to short circuit current and can better prevent fused contacts than contactors with tungsten contacts, but they cannot achieve long-lifetime. Therefore, to implement long contact lifetime, the prior art car power source apparatuses have the drawback that fused contacts due to car-side short circuit cannot be prevented. If contactor contacts become fused together, battery output cannot be cut-off and it is difficult to insure safety. A car power source apparatus that can reliably switch OFF contactors to cut-off battery output under abnormal conditions is in demand. While prior art power source apparatus contactors can achieve long-lifetime, prevention of short circuit current induced fused contacts is extremely difficult. Prior art power source apparatus contactors have the drawback that long-lifetime and prevention of fused contacts are mutually exclusive characteristics that cannot both be satisfactorily realized.

The present invention was developed to resolve these drawbacks. Thus, it is a primary object of the present invention to provide a car power source apparatus that can reliably cut-off battery output in abnormal circumstances while achieving long contactor lifetime.

SUMMARY OF THE INVENTION

The car power source apparatus of the present invention is provided with a battery 1; contactors 2 connected to the output-side of the battery 1; a pre-charge circuit 3 made up of a series connected pre-charge resistor 6 and a pre-charge relay 7 in turn connected with a contactor 2 to supply auxiliary charge to a capacitor 21 connected to the car-side of the battery 1; and a control circuit 4 to control the contactors 2 and pre-charge relay 7. Further, the pre-charge resistor 6 is connected in parallel with a contactor 2, and the pre-charge relay 7 is connected in series with that contactor 2. In this power source apparatus, the control circuit 4 switches the pre-charge relay 7 ON to pre-charge the car-side capacitor 21, and then switches the contactor 2 ON to connect the battery 1 to the car-side.

A car power source apparatus, having the configuration described above, realizes the characteristic that battery output can be reliably cut-off in abnormal circumstances while achieving long contactor lifetime. This is because the pre-charge resistor is connected in parallel with a contactor and the pre-charge relay is connected in series with that contactor. In a power source apparatus of this configuration, the contactor connected in series with the pre-charge relay is maintained in an OFF state, and the pre-charge relay is turned ON to pre-charge the car-side capacitor. Subsequently, the pre-charge relay is maintained ON, and the contactor connected in series with the pre-charge relay is switched ON to connect the battery to the car-side. In this state, battery output is connected to the car-side via the pre-charge relay and the contactors. If a car-side short circuit occurs and contacts fuse together, as long as the contacts of both the pre-charge relay and the series connected contactor do not fuse together, battery output can be cut-off in an abnormal situation. Contact fusing for a series connection of the contactor and the pre-charge relay is less likely. This is because energy resulting from short circuit current flow is distributed among, and dissipated by the contacts of the contactor and the pre-charge relay. For example, if the contacts of both the contactor and the pre-charge relay are "chattering," energy consumption is distributed between both sets of contacts and contact fusing is less likely. Even if contact fusing occurs under these conditions, the probability of contacts fusing together in both the contactor and the pre-charge relay is low. Therefore, battery output can be cut-off by the contacts that do not fuse together. If one set of contacts for the contactor and pre-charge relay retain their ON state without "chattering" under short circuit current conditions while the other set of contacts "chatters," the contacts with no "chatter" will not fuse together even if the "chattering" contacts fuse.

Contactors 2 in the power source apparatus can be provided with a first contactor 2A and a second contactor 2B connected to the positive and negative output-side of the battery 1. In this power source apparatus, the pre-charge resistor 6 is connected in parallel with the first contactor 2A, and the first contactor 2A and the pre-charge relay 7 are connected in series. In this power source apparatus, the first contactor 2A and the second contactor 2B can be switched OFF to cut-off positive and negative battery output. In addition, even if either contactor becomes fused together, battery output can be cut-off.

The contactor 2 connected in series with the pre-charge relay 7 can be provided with longer lifetime contacts than those of the pre-charge relay 7, and the pre-charge relay 7 can be provided with higher capacity contacts than those of the contactor 2 connected in series with the pre-charge relay 7. In this power source apparatus, contacts of the pre-charge relay, which are high-capacity type contacts, are difficult to fuse together with short circuit current, and battery output can be cut-off in abnormal circumstances by switching the pre-charge relay OFF. Further, since the contactor connected in series with the pre-charge relay uses long-lifetime contacts, contact lifetime for both the contactor and the pre-charge relay can be extended by switching the series connected contactor OFF prior to switching the pre-charge relay OFF. Consequently, contact lifetime can be extended while allowing reliable cut-off of battery output in abnormal circumstances.

Contacts of the contactor 2 connected in series with the pre-charge relay 7 can be long-lifetime contacts having tungsten at least on the surface. Specifically, contacts of the contactor 2 connected in series with the pre-charge relay 7 can be long-lifetime contacts with tungsten layered on a copper surface. Further, for the contactor 2 connected in series with the pre-charge relay 7, contacts on one side can be copper, and those on the other side that mate with the copper contacts can be long-lifetime contacts having a tungsten surface. Tungsten contacts can be repeatedly cycled ON and OFF with little damage allowing extended lifetime for the contactor connected in series with the pre-charge relay.

Contacts of the pre-charge relay 7 can be high-capacity type contacts made of copper. In this power source apparatus, short circuit induced fused contacts can be prevented while reducing voltage drop across the pre-charge relay. This is because the copper used in the contacts has low electrical resistance and high specific heat.

Contacts of the second contactor 2B can be higher capacity type contacts compared to those of the first contactor 2A. Further, contacts of the second contactor 2B can be copper high-capacity type contacts. In this power source apparatus, fusing together of the contacts of the second contactor due to short circuit current can be prevented, and battery output can be reliably cut-off in abnormal circumstances.

Further, the delay time for switching OFF the pre-charge relay 7 after switching OFF the contactor 2 connected in series with the pre-charge relay 7 can be stored in memory by the control circuit 4. In this power source apparatus, the time after switching OFF the contactor 2 connected in series with the pre-charge relay 7 is detected to switch OFF the pre-charge relay 7. This power source apparatus can extend contact lifetime for the pre-charge relay. In particular, pre-charge relay contact lifetime can be extended while using high-capacity type contacts. This is because full battery current is shut-off when the pre-charge relay contacts are switched OFF.

The above and further objects of the present invention as well as the features thereof will become more apparent from the following detailed description to be made in conjunction with the accompanying drawings.

DETAILED DESCRIPTION OF THE INVENTION

Figure 2:
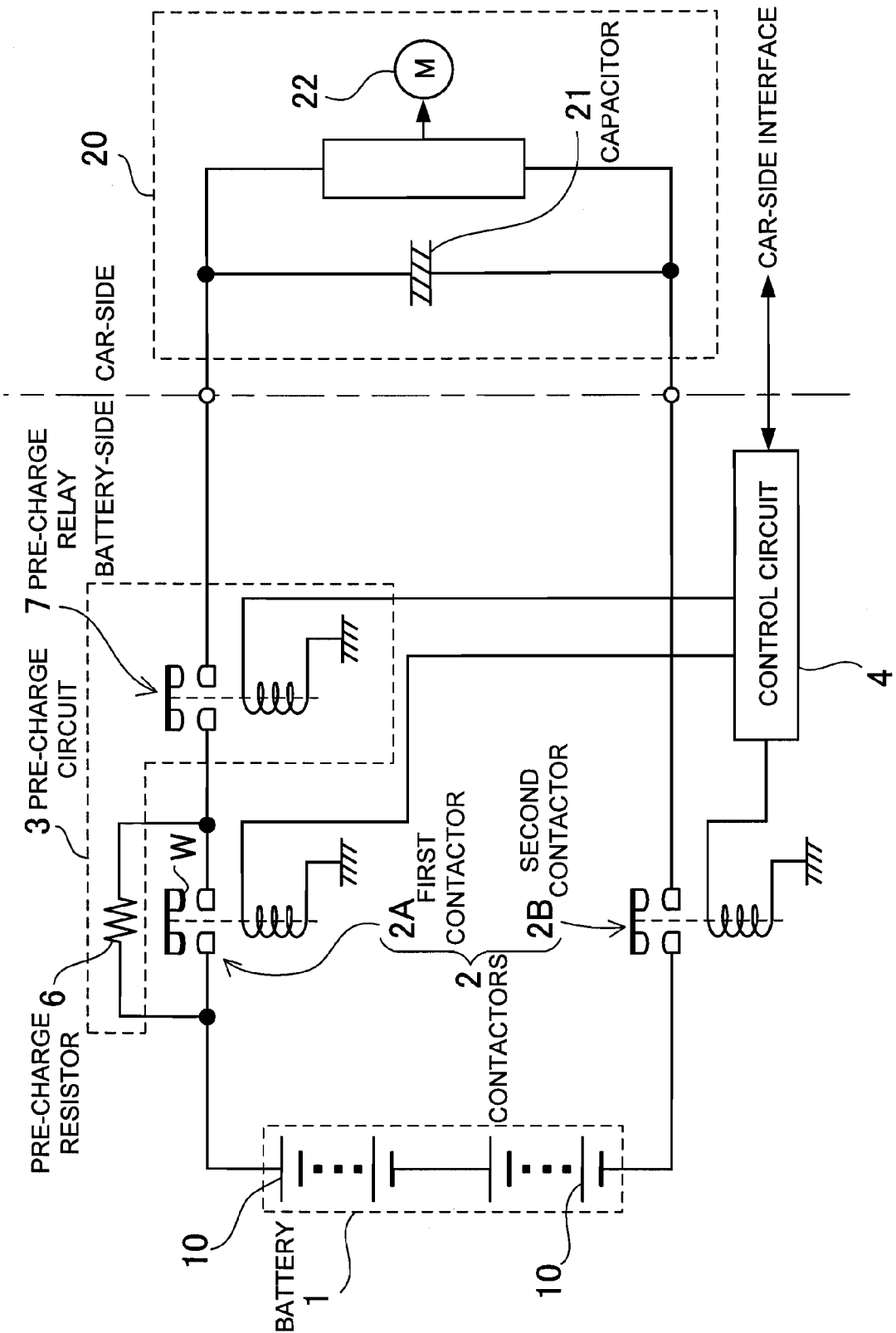
FIG. 2 is a block diagram of an embodiment of the car power source apparatus of the present invention.

The car power source apparatus shown in FIG. 2 is installed in a hybrid car or an electric automobile, and is connected to an electric motor 22 as its load 20 to drive the vehicle. The power source apparatus is provided with a driving battery 1; first and second contactors 2 (2A, 2B) connected to the output-side of the battery 1; a pre-charge circuit 3 to pre-charge a load capacitor 21 prior to switching the first contactor 2A ON; and a control circuit 4 to control the pre-charge circuit 3, the first contactor 2A, and the second contactor 2B ON and OFF.

Figure 3:
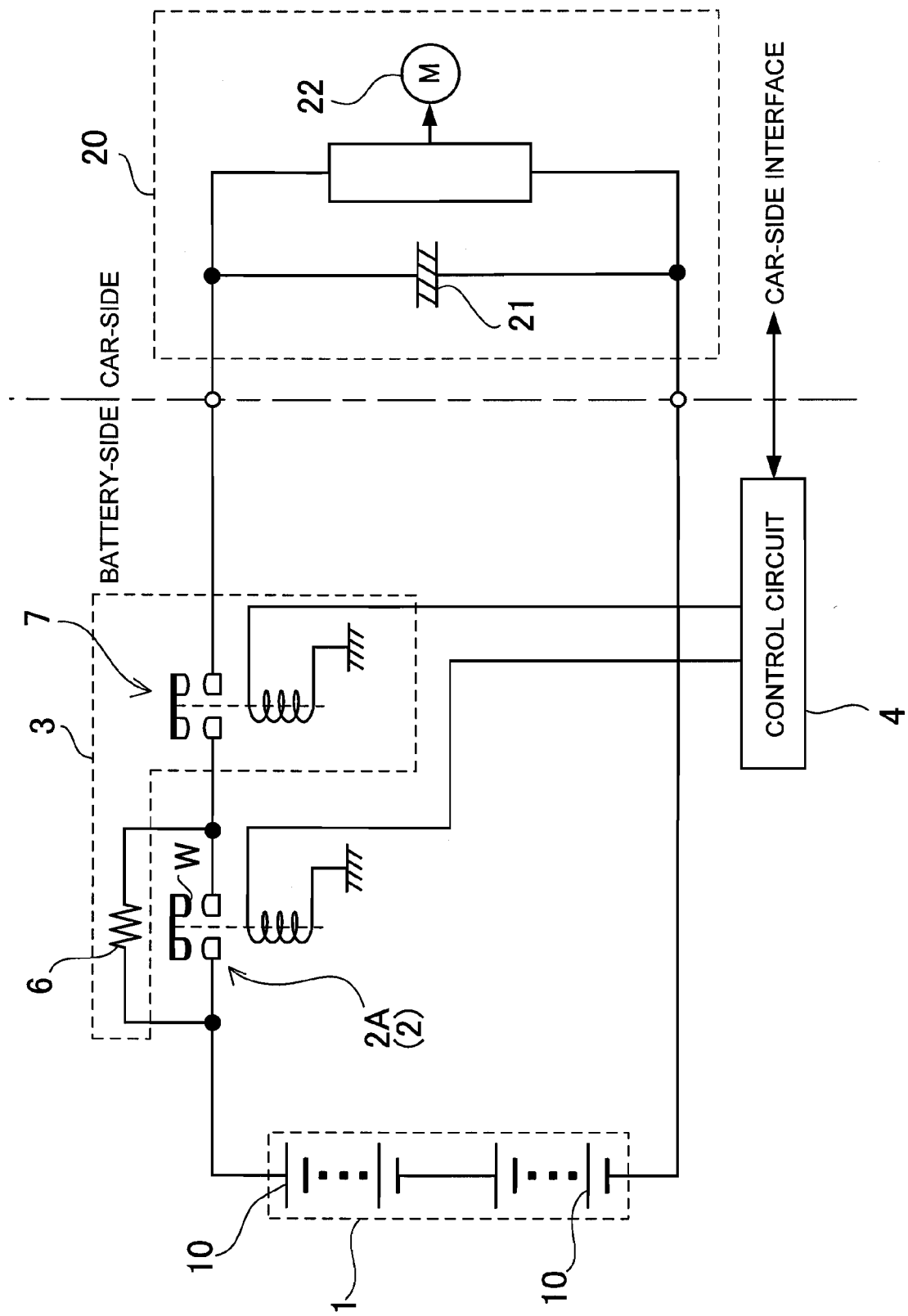
FIG. 3 is a block diagram of another embodiment of the car power source apparatus of the present invention.

As shown in FIG. 3, the power source apparatus of the present invention can have a circuit configuration with a pre-charge circuit 3 and contactor 2 connected only at the positive-side of the battery 1, and with no contactor 2 connected at the negative-side of the battery 1. In addition, although not illustrated, a circuit configuration with a pre-charge circuit 3 and contactor 2 connected only at the negative-side of the battery 1, and with no contactor 2 connected at the positive-side of the battery 1, is also possible.

In the power source apparatus of FIG. 2, the first contactor 2A, which has the pre-charge circuit 3 connected, is connected to the positive-side of the battery 1, and the second contactor 2B, which does not have the pre-charge circuit 3 connected, is connected to the negative-side of the battery 1.

However, although not illustrated, the power source apparatus of the present invention can also be configured with the first contactor 2A, which has the pre-charge circuit 3 connected, connected to the negative-side of the battery 1, and the second contactor 2B, which does not have the pre-charge circuit 3 connected, connected to the positive-side of the battery 1. The following describes in detail a power source apparatus with the circuit structure of FIG. 2.

A capacitor 21 with large capacitance is connected in parallel with the load 20. With the contactors 2 in the ON state, electric power is supplied to the load 20 from both the capacitor 21 and the battery 1. In particular, instantaneous high power is supplied to the load 20 from the capacitor 21. For this reason, the instantaneous power that can be supplied to the load 20 can be increased by connecting a capacitor 21 in parallel with the battery 1. Since the power that can be supplied from the capacitor 21 to the load 20 is proportional to the capacitance, a capacitor 21 with extremely high capacitance, for example, 4000 μF to 6000 μF, is used. When a high capacitance capacitor 21 in the discharged state is connected to a battery 1 with high output voltage, extremely high transient charging current will flow. This is because the impedance of capacitor 21 is very low.

The battery 1 activates the electric motor 22 that drives the car. To supply high power to the motor 22, output voltage of the battery 1 is increased by connecting many rechargeable batteries 10 in series. Nickel hydride batteries or lithium ion rechargeable batteries are used as the rechargeable batteries 10. However, any batteries that can be recharged, such as nickel cadmium batteries, can be used as the rechargeable batteries 10. To supply high power to the motor 22, battery output is increased to a high voltage, for example, 300V to 400V. However, battery output voltage for the power source apparatus can be also increased by connecting a DC/DC converter to the output-side of the battery 1 (not illustrated). In this type of power source apparatus, the number of rechargeable batteries connected in series can be reduced and battery output voltage can be lowered. For example, battery output voltage can be 150V to 400V.

The pre-charge circuit 3 pre-charges the capacitor 21 while limiting current. This pre-charge circuit 3 has a pre-charge resistor 6 and pre-charge relay 7 connected in series. The pre-charge resistor 6 is connected in parallel with the first contactor 2A, and the pre-charge relay 7 is connected in series with the first contactor 2A. Consequently, the positive-side of the battery 1 connects to the car-side via a series connection of the first contactor 2A and the pre-charge relay 7. Therefore, the positive-side of the battery 1 can be cut-off from the car-side by switching OFF either the first contactor 2A or the pre-charge relay 7.

In this power source apparatus, when the ignition switch (not illustrated) is turned ON, the second contactor 2B is switched ON. Subsequently, the first contactor 2A is maintained in the OFF state while the pre-charge relay 7 is switched ON to pre-charge the capacitor. After the capacitor is pre-charged, the control circuit maintains the second contactor 2B and the pre-charge relay 7 ON and switches the first contactor 2A ON. When the ignition switch is turned OFF, the first contactor 2A, which is connected in series with the pre-charge relay 7, is switched OFF. Subsequently, the second contactor 2B and the pre-charge relay 7 are switched OFF to cut-off battery output at the positive and negative-sides.

The pre-charge resistor 6 limits pre-charge current to the load 20 capacitor 21. Pre-charge current of the pre-charge circuit 3 can be reduced by increasing the electrical resistance value of the pre-charge resistor 6. For example, in a power source apparatus with 400V of battery output voltage and a 10Ω pre-charge resistor, the maximum value of the pre-charge current is 40 A. The maximum value of the pre-charge current can be reduced by increasing the resistance of the pre-charge resistor 6. However, the time to pre-charge the capacitor 21 becomes longer as the resistance of the pre-charge resistor 7 is increased. This is because the pre-charge current decreases. The resistance of the pre-charge resistor 6 is set in consideration of the pre-charge current and the time for pre-charging, and is, for example 5Ω to 20Ω, preferably 6Ω to 18Ω, and more preferably 6Ω to 15Ω.

Figure 1:
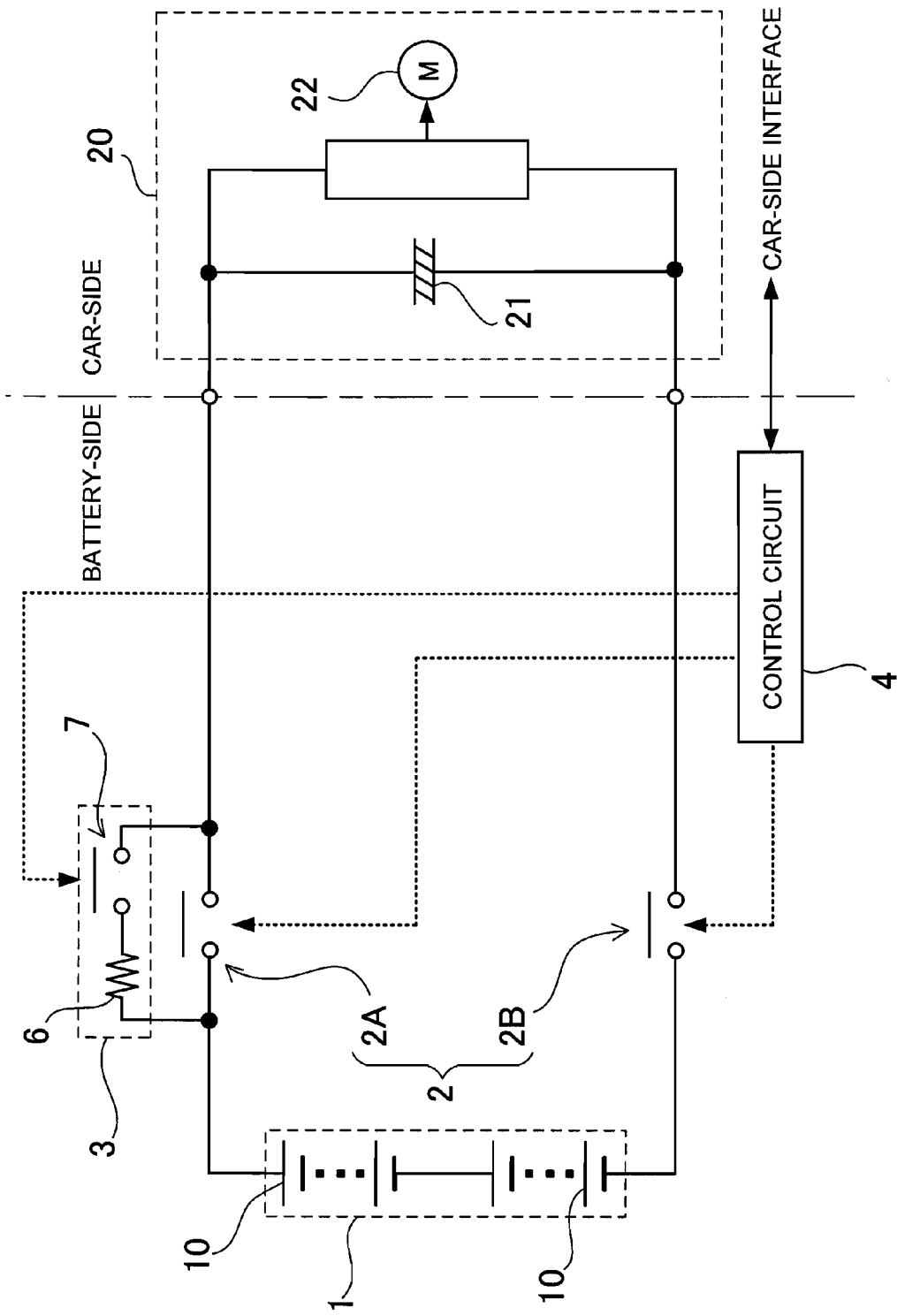
FIG. 1 is a block diagram of a prior art car power source apparatus.

The pre-charge resistor 6 of the pre-charge circuit 3 is connected in parallel with the first contactor 2A. The first contactor 2A is connected on the positive-side of the battery 1, the second contactor 2B is connected on the negative-side, and the pre-charge circuit 3 is connected on the positive-side. The capacitor 21 is pre-charged by the pre-charge circuit 3 with the second contactor 2B, which is connected to the negative-side of the battery 1, in the ON state. For the prior art power source apparatus of FIG. 1, after the capacitor 21 is pre-charged by the pre-charge circuit 3, the positive-side contactor 2A is switched ON and the pre-charge circuit 3 pre-charge relay 7 is switched OFF.

The control circuit 4 for the power source apparatus of FIG. 2 controls the first contactor 2A, the second contactor 2B, and the pre-charge relay 7 with signals input from the ignition switch (not illustrated), which is the main switch on the car-side. For an ON signal from the ignition switch, the control circuit 4 maintains the first contactor 2A in the OFF state, and switches the second contactor 2B and the pre-charge relay 7 ON to pre-charge the capacitor 21. After the capacitor has been pre-charged, the pre-charge relay 7 is maintained in the ON state and the first contactor 2A is switched ON to connect the positive-side and the negative-side of the battery 1 to the car-side.

Figure 4:
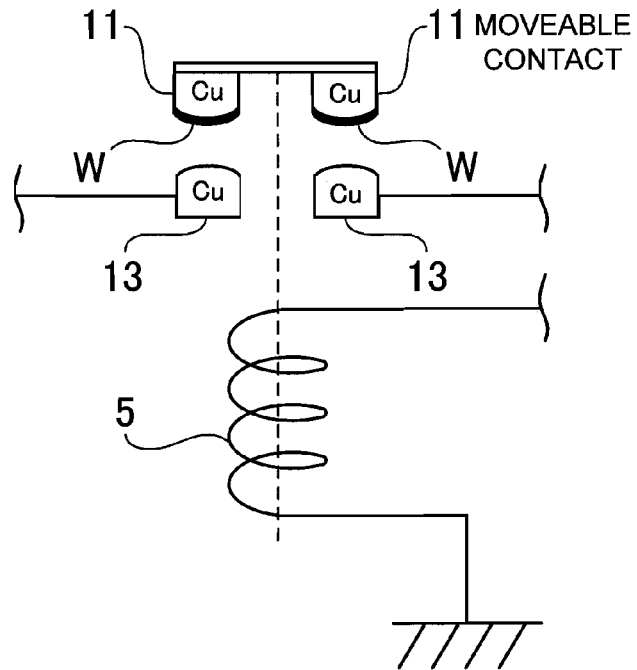
FIG. 4 is an abbreviated diagram of a relay used as the first contactor shown in FIG. 2.
Figure 5:
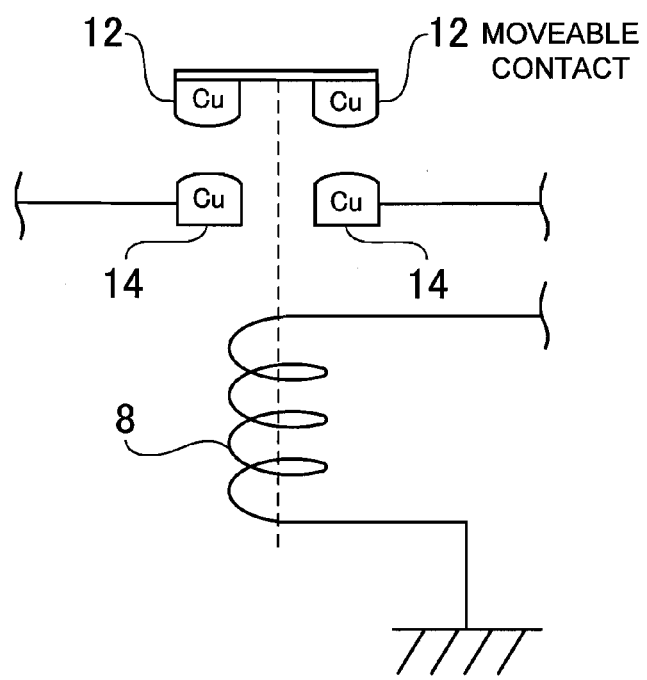
FIG. 5 is an abbreviated diagram of a relay used as the pre-charge relay and the second contactor shown in FIG. 2.

The first contactor 2A, the second contactor 2B, and the pre-charge relay 7 are relays having mechanically moveable contacts. FIG. 4 shows an abbreviated diagram of a relay for the first contactor, and FIG. 5 shows an abbreviated diagram of a relay for the pre-charge relay and the second contactor. In the relays shown in these figures, the control circuit 4 controls current in the magnetic coil 5, 8 to switch the contacts ON and OFF. A relay has a plunger that is pulled in by current flow through the magnetic coil 5, 8, and moveable contacts 11, 12 are attached to that plunger. Fixed contacts 13, 14 are disposed opposite the moveable contacts 11, 12. When current flows through the magnetic coil 5, 8, the plunger is pulled into the coil to put the moveable contacts 11, 12 into contact with the fixed contacts 13, 14 and turn the relay ON. When current through the magnetic coil is cut-off, the plunger returns to its initial position via a spring, the moveable contacts 11, 12 separate from the fixed contacts 13, 14, and the relay is switched OFF.

The relay of FIG. 4 (used for the first contactor 2A) is provided with high durability, longer-lifetime contacts 11 than those of the pre-charge relay 7. This is to achieve sufficient durability for repeated ON-OFF switching. The relay of FIG. 4 is provided with high durability contacts 11 with tungsten surfaces. Tungsten has a higher melting point and longer-lifetime compared to metals such as copper. In the relay of FIG. 4, tungsten is layered on the surface of copper to make highly durable contacts 11. In this relay, fixed contacts 13 are copper, and moveable contacts 11 have a tungsten surface. The moveable contacts 11 have tungsten layered on the surface of copper for high durability. Although not illustrated, the relay for the first contactor 2A can also have high durability contacts with moveable contacts that are copper and fixed contacts that have tungsten layered on the surface of copper. Although contacts with a tungsten surface have superior durability compared to copper contacts, the present invention does not limit the material for high durability contacts to tungsten. Contacts for the first contactor 2A can use any metal that results in contacts that are more durable than those of the pre-charge relay 7. For example, tungsten alloys and other metals can be used, and high durability contacts can be solid single-metal contacts rather than a layered structure of different metals.

FIG. 5 shows a relay used as the second contactor 2B and the pre-charge relay 7, and it is provided with contacts 12, 14 that are higher capacity than those of the first contactor 2A. The relay has fixed contacts 14 and moveable contacts 12 that are copper. The fixed contacts 14 and moveable contacts 12 can also be high capacity type contacts made of a copper alloy rather than pure copper. Compared to high durability contacts such as tungsten, copper contacts, which are high capacity type contacts, have smaller electrical resistance, larger specific heat, and generate less heat due to short circuit current. For example, compared to a 900° C. contact temperature due to short circuit current for copper contacts, high durability tungsten contacts would reach approximately 1500° C. Since the melting point of copper is 1000° C., copper contacts would fuse together if heated to 1500° C. For high capacity type copper contacts as fixed contacts and moveable contacts, even if heated to 900° C. by short circuit current, the contacts will not fuse together. This is because 900° C. is below the melting point of copper. However, these copper contacts will not be high durability, long-lifetime contacts.

To extend the lifetime of high capacity type contacts in the pre-charge relay 7 and second contactor 2B, the control circuit 4 switches OFF the second contactor 2B and the pre-charge relay 7 after cutting-off battery current with the first contactor 2A. Therefore, the control circuit 4 controls the first contactor 2A, the second contactor 2B, and the pre-charge relay 7 ON and OFF according to the following operation.

The control circuit 4 pre-charges the car-side capacitor 21 when an ignition switch ON signal is detected. The control circuit 4 switches the second contactor 2B and the pre-charge relay 7 ON with the first contactor 2A in the OFF state to pre-charge the capacitor. In this state, capacitor pre-charge current is limited by the pre-charge resistor 6. The control circuit 4 detects completion of capacitor pre-charge from the time passed since pre-charge was started, the car-side voltage, and the pre-charge current. Since pre-charge is complete when a given time has elapsed after the start of pre-charge, pre-charge completion can be detected from elapsed time. In addition, since the voltage across the capacitor increases and pre-charge current decreases as the capacitor becomes pre-charged, pre-charge completion can be detected from the car-side voltage or pre-charge current. After the control circuit 4 detects completion of the pre-charge, it maintains the second contactor 2B and the pre-charge relay 7 ON and switches ON the first contactor 2A, which was in the OFF state. In this state, power is supplied from the battery 1 to the car-side.

When the control circuit 4 detects an ignition switch OFF signal, it maintains the second contactor 2B and the pre-charge relay 7 in the ON state and switches the first contactor 2A OFF. Subsequently, the control circuit 4 switches the pre-charge relay 7 and the second contactor 2B OFF.

The power source apparatus of the present invention can be installed in a vehicle to supply power to the electric motor that drives the vehicle.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2008-40716 filed in Japan on Feb. 21, 2008, the content of which is incorporated herein by reference.

What is claimed is:

1. A power source apparatus comprising:
a battery;
a plurality of contactors connected to an output-side of the battery;
a capacitor connected to a load-side of the battery;
a pre-charge circuit connected in series to one contactor among the plurality of contactors, the pre-charge circuit including a series connection of a pre-charge resistor and a pre-charge relay that provides an auxiliary charge to the capacitor; and
a control circuit to control the plurality of contactors and the pre-charge relay,
wherein the pre-charge resistor is connected in parallel with the one contactor, and the pre-charge relay is connected in series with the one contactor,
the control circuit switches the pre-charge relay ON to pre-charge the capacitor connected to the load-side of the battery, and switches the one contactor ON to connect the battery to the load-side, and
the contactor connected in series with the pre-charge relay is provided with contacts that are of a higher durability and lifetime than those of the pre-charge relay, while the contacts of the pre-charge relay are of a higher capacity type than those of the contactor connected in series with the pre-charge relay.

2. The power source apparatus as claimed in claim 1, wherein the plurality of contactors include a first contactor and a second contactor connected to positive and negative output-sides of the battery, and the pre-charge resistor is connected in parallel with the first contactor, and the first contactor is connected in series with the pre-charge relay.

3. The power source apparatus as claimed in claim 2, wherein the first contactor is connected to the positive output-side of the battery and the second contactor is connected to the negative output-side of the battery.

4. The power source apparatus as claimed in claim 1, wherein the pre-charge circuit and the one contactor are connected only to a positive output-side of the battery.

5. The power source apparatus as claimed in claim 1, wherein the battery has many rechargeable batteries connected in series and the rechargeable batteries are lithium ion batteries.

6. The power source apparatus as claimed in claim 1, wherein the battery has many rechargeable batteries connected in series and the rechargeable batteries are nickel hydride batteries.

7. The power source apparatus as claimed in claim 1, wherein an electrical resistance of the pre-charge resistor is from 5Ω to 20Ω.

8. The power source apparatus as claimed in claim 1, wherein the contacts of the contactor connected in series with the pre-charge relay are highly durable, long-lifetime contacts having tungsten at least on a surface.

9. The power source apparatus as claimed in claim 8, wherein the contacts of the contactor connected in series with the pre-charge relay are highly durable, long-lifetime contacts having tungsten layered on a copper surface.

10. The power source apparatus as claimed in claim 8, wherein the contacts of the contactor connected in series with the pre-charge relay are highly durable, long-lifetime contacts with copper contacts on one side and tungsten on a surface of the contacts on another side, which mates with the copper contacts.

11. The power source apparatus as claimed in claim 8, wherein the contacts of the contactor connected in series with the pre-charge relay are highly durable, long-lifetime contacts with fixed contacts of copper and moveable contacts, which mate with the fixed contacts, having tungsten on the surface.

12. The power source apparatus as claimed in claim 8, wherein the contacts of the contactor connected in series with the pre-charge relay are highly durable, long-lifetime contacts with fixed contacts of copper and moveable contacts, which mate with the fixed contacts, made of an alloy of tungsten.

13. The power source apparatus as claimed in claim 8, wherein the contacts of the first contactor connected in series with the pre-charge relay have a layered structure of different kinds of metals.

14. The power source apparatus as claimed in claim 1, wherein the contacts of the pre-charge relay are high capacity type contacts made of copper.

15. The power source apparatus as claimed in claim 2, wherein the contacts of the second contactor are higher capacity type contacts compared to those of the first contactor.

16. The power source apparatus as claimed in claim 15, wherein the contacts of the second contactor are high capacity type contacts made of copper.

17. The power source apparatus as claimed in claim 15, wherein the contacts of the second contactor are high capacity type contacts made of an alloy of copper.

18. The power source apparatus as claimed in claim 1, wherein the control circuit stores in a memory a delay time to switch the pre-charge relay OFF after switching OFF the contactor connected in series with the pre-charge relay, and the control circuit detects a time elapsed after switching OFF the contactor connected in series with the pre-charge relay to switch OFF the pre-charge relay.

19. The power source apparatus as claimed in claim 1, wherein the control circuit controls at least one of the contactors or the pre-charge relay to cut off battery output into the load-side during short circuit current conditions.

20. A power source apparatus comprising:
a battery;
a plurality of contactors connected to an output-side of the battery;
a capacitor connected to a load-side of the battery;
a pre-charge circuit connected in series to one contactor among the plurality of contactors, the pre-charge circuit including a series connection of a pre-charge resistor and a pre-charge relay that provides an auxiliary charge to the capacitor; and
a control circuit to control the plurality of contactors and the pre-charge relay,
wherein the pre-charge resistor is connected in parallel with the one contactor and the pre-charge relay is connected in series with the one contactor, and
the control circuit switches the pre-charge relay ON to pre-charge the capacitor connected to the load-side of the battery, and after the control circuit detects completion of the pre-charge, the control circuit switches the contactor to an ON state from an OFF state to connect the battery to the load-side with both the one contactor and the pre-charge relay connected in series being in the ON state.

* * * * *